Oct. 13, 1942.                G. H. JOHNSON                2,298,485
                                TIRE MOLD
                            Filed March 1, 1940
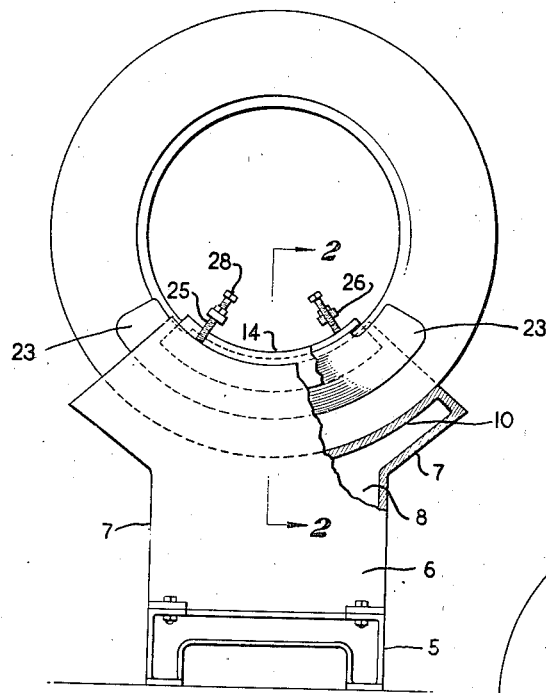
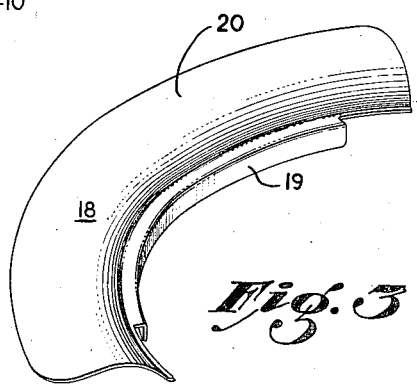
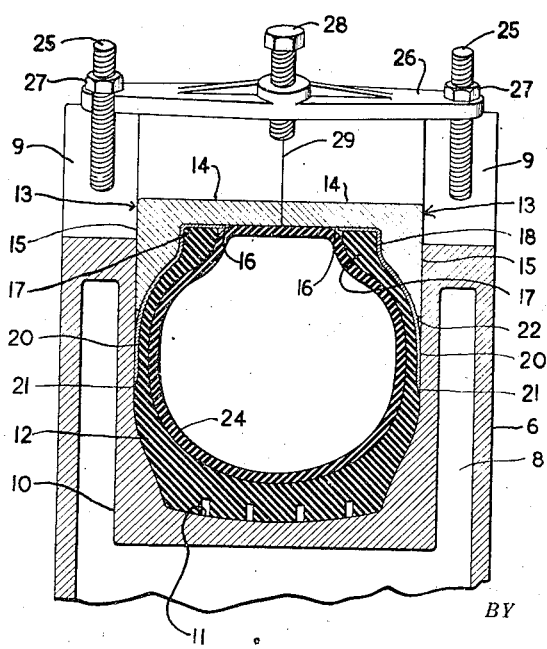
GEORGE H. JOHNSON,
INVENTOR;
BY Joseph F. Westall
ATTORNEY.

Patented Oct. 13, 1942

2,298,485

UNITED STATES PATENT OFFICE 2,298,485

TIRE MOLD

George H. Johnson, Los Angeles, Calif.

Application March 1, 1940, Serial No. 321,707

7 Claims. (Cl. 18—18)

This invention relates to tire molds, and more particularly contemplates auxiliary equipment adapted for use in conjunction with the bead plates of repair molds for pneumatic tires.

Heretofore in repairing tires, the art has made use of two-piece mold apparatus which consists generally of a hollow casing having a mold cavity of a size and shape to accommodate approximately the outer half of a section of tire to be repaired and a bead plate or plates adapted to be associated with the casing for shaping and curing the inner portion of the section. The bead plates in common usage are usually composed of cast aluminum or iron, and, accordingly, their curing surfaces are porous and difficult to clean. Another disadvantage in such prior devices is that the edges of the bead plates in the mold cavity necessarily interrupt the inner surface of the composite mold with the result that a ridge or depression is formed on the walls of the repaired section of the tire, marring uniformity in the contour of the tire.

A general object of the present invention is to provide shims or liners adapted for use in pairs to line the bead plates, and thereby obviate the aforementioned and numerous other disadvantages in mold structures of the prior art.

Another object is to provide a thin liner of the character alluded to composed of metal having a polished surface to facilitate cleaning, and which conforms in shape to the contour of the outer surfaces of the inner portion of a tire and bridge the edges of the bead plates in the mold cavity, the edges of the liner being bevelled to a sharp edge so as to lie against the wall of the principal mold and present a smooth uninterrupted surface to the rubber on the tire casing to be cured.

Another object is to provide a flexible shim, curved to the contour of the tire, of greater length than the principal mold and bead plates whereby the pressure on the section of the tire being repaired in the mold is gradually relieved from the end of the mold outwardly to obviate the formation of end marks by the mold and bead plates.

Another object is the provision of a flexible flange or a lip on each shim corresponding in shape to the beads of the tire on which the flange of each shim is adapted to seat, said flange or lip being shorter than the adjacent portion of the shim which overlies the side wall of the tire to enable the use of the shim used with different molds adapted to receive tires of several sizes.

Other objects and corresponding advantages such, for example, as simplicity of manufacture and in use, will be apparent to those of skill in the art from an examination of the following description read in the light of the accompanying drawing, in which:

Fig. 1 is an elevation of a mold structure illustrating the shims of my invention arranged therein as in use;

Fig. 2 is a sectional view taken on lines 2—2 of Fig. 1, showing particularly the location of the shims in the mold cavity relative to the tire and bead plates;

Fig. 3 is an enlarged perspective view of one of the shims.

Referring to the drawing in detail, the numerals of which indicate similar parts throughout the several views, 5 designates a base by which the apparatus is supported, and 6 and 7, respectively, side and end walls mounted on the base and forming therebetween a steam chamber 8 or a chamber in which other conventional heating means may be employed. The upper edges 9 of the side walls 6 join integrally with an arcuate mold 10 suspended within the steam chamber, the latter flanking sides of mold 10. The interior surface of the bottom and of the adjoining lower portions of mold 10 forming the mold cavity 11 are shaped to the contour of the periphery of the tire section 12 for the repair of which the apparatus is adapted. The upper portion of the walls of the mold 10 is vertical and spaced apart a distance equal to the greatest thickness of tire 12.

The top portion of the composite mold comprises what is commonly known as a bead plate or plates. In the embodiment illustrated, two complementary bead plates 13, generally L-shaped in cross section, are employed, each of which consist of a top wall 14 having an arcuate upper surface at right angles to the outer surface of a side wall 15. The inner surfaces 16 of the bead plates correspond in shape to the respective beads 17 and the adjoining portions of the side walls of a tire having the contour desired to be produced or preserved in the repaired section.

A pair of complementary shims 18 composed of thin flexible sheets of metal, preferably polished steel and nickel-plated, line the bead plates 13, each shim 18 comprising a lip 19 (Fig. 3), flat in cross-section but longitudinally arcuate to overlie the bead 17 of the tire, and a depending side portion 20 extending downwardly over the side wall of the tire, bent and curved outwardly following the contour of the tire wall and terminating in an edge 21 below the lower edge 22 of the bead plates in the mold cavity. The edge 21 of each shim in cavity 11 is bevelled to obviate the formation of a shoulder whereby the shims continue, uninterruptedly, the smooth surface afforded by the lower portion of the mold cavity 11 and bridge the blunt edge 22 of the bead plates adjacent the side wall of the tire. The arcuate lip 19 is preferably shorter than the mold cavity and the bead plates 13 in order to adapt it for use with bead plates of several sizes, slight variations in the radii of the arcs of the plates being of lesser importance where the arc of the lip is shorter. The depending side walls 20 of shims 18, however, extend from the ends of mold cavity 11 as indicated at 23 (Fig. 1), and are adapted to flex slightly to avoid a sharp bulge of the tire at the ends of the mold when pressure is applied to the interior of the tire, as is about to be described, which would otherwise produce marks on the repaired tire.

A rubber curing bag 24 placed within the tire 12 and mold 10 is adapted for inflation so as to expand the tire outwardly against the mold, bead plates 13, and the shims 18 of my invention.

A pair of upstanding screws 25 are threaded in opposite upper edges 9, adjacent each end of the latter, screws 25 being disposed longitudinally in radii of the arc of the mold. The ends of an arm 26 arranged transversely above and across the bead plates are slidably mounted on each opposed pair of screws 25 adjacent opposite ends of the mold. Nuts 27 threaded on the screws above arms 26 limit the elevation of the arms with respect to the mold 10 and bead plates 13, and permit alignment of arms 26 parallel to the upper surface of walls 14 of the bead plates when the arms are raised into contact with the nuts 27, as will appear. A machine screw 28, threaded through the middle of each arm 26, is adapted to bear against the upper surface of the two bead plates 13 adjacent their abutting edges 29. Threading of the screws through the arms into contact with bead plates 13 raises the arms against their respective nuts 28 and counteracts the tendency of curing bag 24, when inflated, to raise the bead plates from the tire. Being flexible, the sides 20 of shims 18 are adapted to conform to the contour of molds of slightly different size or shape.

It will thus be seen from the foregoing that I have provided a composite mold construction presenting a smooth unbroken surface to the entire outer surface of the section of a tire to be repaired, which may be assembled and disassembled with facility, and is more readily cleaned than heretofore possible due to the hard, smooth surface of shims 18 lining bead plates 13.

While I have described but one embodiment of my invention, it will be understood that the specific mold structure with which the shims are depicted is only illustrative, and that the shims may vary in size, shape, design, or proportion of their various elements for adaptation to modified forms of molds and tires of different shapes, without departing from the spirit of my invention as defined by the appended claims.

What I claim and desire to secure by Letters Patent is:

1. In a mold structure for tire sections, a mold forming a mold cavity having a surface conforming to the shape of the outermost portion of the exterior surface of the tire section, a pair of bead plates disposed in said cavity having inner surfaces conforming in contour to the inner portion of the exterior surface of the tire section, and a shim to line each of said bead plates and a portion of the mold cavity.

2. In a mold structure for tire sections, a mold forming a mold cavity having a surface conforming to the shape of the outermost portion of the exterior surface of the tire section, a pair of bead plates disposed in said cavity having inner surfaces conforming in contour to the inner portion of the exterior surface of the tire section, and a shim to line the portion of each of said bead plates in said mold cavity having a lower edge contacting the mold.

3. In a mold structure for tire sections, a mold forming a mold cavity having a surface conforming to the shape of the outermost portion of the exterior surface of the tire section, a pair of bead plates disposed in said cavity having an inner surface conforming in contour to the inner portion of the exterior surface of the tire section, and a shim to line the portion of each of said bead plates in said mold cavity having a lower portion contacting the mold, said last-named portion being beveled to a sharp edge.

4. In a mold structure for tire sections, a mold forming a mold cavity shaped to conform to the outermost portion of the exterior surface of the tire section, a pair of bead plates bridging the innermost portion of the tire section and extending into the mold cavity at opposite sides of the tire; a shim lining each bead plate comprising a lip to engage the bead of the tire and a depending portion shaped to conform to the contour of the exterior surface of the inner portion of one side of the tire, said depending portions extending into the mold cavity below the edges of the bead plates, respectively.

5. In a mold structure for tire sections, a mold forming a mold cavity shaped to conform to the outermost portion of the exterior surface of the tire section, a pair of bead plates bridging the innermost portion of the tire section and extending into the mold cavity at opposite sides of the tire, a shim lining each bead plate comprising a lip to engage the bead of the tire and a depending portion shaped to conform to the contour of the exterior surface of the inner portion of one side of the tire, said depending portions extending into the mold cavity below the edges of the bead plates, respectively, the portions of the shims in the mold cavity being beveled to sharp edges to form with the mold a smooth surface for the entire exterior surface of the tire section being treated, the lip of each shim being shorter than the length of the mold.

6. In a mold structure for tire sections, a mold forming a mold cavity shaped to conform to the outermost portion of the exterior surface of the tire section, a pair of bead plates bridging the innermost portion of the tire section and extending into the mold cavity at opposite sides of the tire, a shim lining each bead plate comprising a lip to engage the bead of the tire and a depending portion shaped to conform to the contour of the exterior surface of the inner portion of one side of the tire, said depending portions extending into the mold cavity below the edges of the bead plates, respectively, the portions of the shims in the mold cavity being beveled to sharp edges to form with the mold a smooth surface for the entire exterior surface of the tire section being treated, the lip of each shim being shorter than the length of the mold, the depending portion of each shim being of greater length than the mold cavity so as to distribute pressure of the mold edges over the area of the tire section covered by the ends of the shims protruding from the mold.

7. In a mold structure for tire sections, a mold forming a mold cavity having a surface conforming to the shape of the outermost portion of the exterior surface of the tire section, a bead plate having an inner surface conforming in shape to an inner portion of the exterior surface of the tire section, and a shim to line said bead plate and a portion of the mold cavity.

GEORGE H. JOHNSON.